(12) United States Patent
Shimizu

(10) Patent No.: US 10,225,738 B2
(45) Date of Patent: Mar. 5, 2019

(54) REMOTE OPERATION SYSTEM, RELAY APPARATUS, MOBILE COMMUNICATION APPARATUS, IN-TERMINAL SERVER CONTROL METHOD, AND RELAY PROCESSING METHOD

(75) Inventor: Kazuto Shimizu, Kanagawa (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 626 days.

(21) Appl. No.: 13/977,425

(22) PCT Filed: Jan. 31, 2012

(86) PCT No.: PCT/JP2012/000642
§ 371 (c)(1),
(2), (4) Date: Jun. 28, 2013

(87) PCT Pub. No.: WO2012/105241
PCT Pub. Date: Aug. 9, 2012

(65) Prior Publication Data
US 2013/0288661 A1    Oct. 31, 2013

(30) Foreign Application Priority Data
Feb. 3, 2011   (JP) ................... 2011-021638

(51) Int. Cl.
| H04M 3/00 | (2006.01) |
| H04W 12/08 | (2009.01) |
| G08C 17/00 | (2006.01) |
| H04M 1/725 | (2006.01) |
| G08C 17/02 | (2006.01) |

(52) U.S. Cl.
CPC ............ H04W 12/08 (2013.01); G08C 17/00 (2013.01); G08C 17/02 (2013.01);
(Continued)

(58) Field of Classification Search
CPC .................... H04W 88/02; H04M 1/72533
See application file for complete search history.

(56) References Cited

U.S. PATENT DOCUMENTS

2005/0068151 A1* 3/2005 Ushida ................... G08C 19/28
340/3.71
2007/0130476 A1   6/2007 Mohanty
(Continued)

FOREIGN PATENT DOCUMENTS

| EP | 1933287 A2 | 6/2008 |
| JP | 2002-300655 A | 10/2002 |

(Continued)

OTHER PUBLICATIONS

Communication dated Mar. 5, 2015 from the European Patent Office in counterpart European Application No. 12742307.7.
Communication dated Aug. 25, 2015, issued by the Japan Patent Office in corresponding Japanese Application No. 2012-555754.

*Primary Examiner* — Shantell L Heiber
(74) *Attorney, Agent, or Firm* — Sughrue Mion, PLLC

(57) ABSTRACT

A relay apparatus according to the present invention includes reception means for receiving a remote operation request, storage means for associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information, determination means for comparing the first identification information and the second identification information included in the permission information with the first identification information and the second identification information included in the remote operation request, respectively, to determine whether to allow the remote operation, and transmission means for generating a control message to transmit the control message upon determination in the determination means that the remote operation is allowed. According to the configuration, it is possible to start (Continued)

remote operation without requiring the controlled-side user to start up the server by himself/herself in response to the request for the remote operation.

9 Claims, 6 Drawing Sheets

(52) U.S. Cl.
CPC ... *H04M 1/72533* (2013.01); *H04M 1/72597* (2013.01); *G08C 2201/40* (2013.01); *G08C 2201/60* (2013.01); *G08C 2201/93* (2013.01)

(56) References Cited

U.S. PATENT DOCUMENTS

| | | | | |
|---|---|---|---|---|
| 2009/0154474 A1* | 6/2009 | Arima | ............... | H04L 29/12783 370/400 |
| 2011/0105159 A1* | 5/2011 | Hirayama | ............... | G06F 3/147 455/466 |
| 2011/0124362 A1* | 5/2011 | Wakasa | ..................... | G06F 3/16 455/511 |
| 2012/0135692 A1* | 5/2012 | Feri | ........................ | G08C 17/02 455/67.14 |

FOREIGN PATENT DOCUMENTS

| | | |
|---|---|---|
| JP | 2002287915 A | 10/2002 |
| JP | 2003-116181 A | 4/2003 |
| JP | 2003-152895 A | 5/2003 |
| JP | 2004-328578 A | 11/2004 |
| JP | 2004341776 A | 12/2004 |
| JP | 2005-198099 A | 7/2005 |
| JP | 2007-058260 A | 3/2007 |
| JP | 200964362 A | 3/2009 |
| JP | 2009-146431 A | 7/2009 |
| JP | 2010211615 A | 9/2010 |

* cited by examiner

| MANAGEMENT NUMBER | PERMISSION INFORMATION | |
|---|---|---|
| | CONTROLLED-SIDE IDENTIFICATION INFORMATION | CONTROL-SIDE IDENTIFICATION INFORMATION |
| N001 | 080-xxxx-xx23 / aaaa@xx.yy.jp | 080-xxxx-xx89 / kkkk@gg.pp.jp |
| N002 | 080-xxxx-xx23 / aaaa@xx.yy.jp | 080-xxxx-xx15 / pppp@zz.zz.jp |
| N003 | 080-xxxx-xx23 / aaaa@xx.yy.jp | 050-xxxx-xx67 / aaaa@xx.yy.jp |
| N004 | 090-xxxx-xx47 / bbbb@ss.tt.jp | 090-xxxx-xx33 / ffff@ss.tt.jp |
| N005 | 080-xxxx-xx23 / cccc@xx.yy.jp | 080-xxxx-xx58 / tttt@cc.aa.jp |
| N006 | 080-xxxx-xx23 / cccc@xx.yy.jp | 090-xxxx-xx91 / yyyy@kk.oo.jp |
| | | |
| | | |
| | | |

Fig. 2

REMOTE OPERATION SYSTEM, RELAY APPARATUS, MOBILE COMMUNICATION APPARATUS, IN-TERMINAL SERVER CONTROL METHOD, AND RELAY PROCESSING METHOD

CROSS REFERENCE TO RELATED APPLICATIONS

This application is a National Stage of International Application No. PCT/JP2012/000642 filed Jan. 31, 2012, claiming priority based on Japanese Patent Application No. 2011-021638 filed Feb. 3, 2011, the contents of all of which are incorporated herein by reference in their entirety.

TECHNICAL FIELD

The present invention relates to a remote operation system, a relay apparatus, a mobile communication apparatus, an in-terminal server control method, and a relay processing method, and more particularly, to a mobile communication apparatus including a server function, a relay apparatus used to remotely operate the apparatus, a remote operation system including the mobile communication apparatus and the relay apparatus, and a method used in the system.

BACKGROUND ART

In recent years, in personal information equipment such as a mobile telephone, there has been an increasing need for disclosing information acquired by a sensor function included in the information equipment itself or data stored in the information equipment to registered friends, a family, and the like.

For example, there is a demand that a user B who is a family member of a user A desires to acquire position information obtained by a global positioning system (GPS) function included in a mobile telephone terminal P by equipment Q1 that the user B has in order to check the current location of the user A of the terminal P. Further, there is a demand that the user A desires to allow a friend C to view photographic data taken by a built-in camera of the terminal P and stored in the terminal P from equipment Q2 owned by the friend C.

One method to provide services that satisfy these needs includes a method of installing a server function in the mobile telephone terminal P, which is thus used to transmit the position information or photographic data stated above via server function processing upon receiving a request according to a certain protocol from an external device.

Such a method may include a method using generally-known Web technology, for example, which allows a Web server installed in a terminal to make a predetermined reply upon receiving a hyper text transfer protocol (HTTP) request, including a uniform resource locator (URL) and a port number, from an external device.

Generally speaking, the foregoing server function has been installed in a server device configured of a large-scale computer, for example, which performs authentication to confirm whether or not an authorized user is currently accessing using a client terminal, such as a mobile phone, via a network (e.g., Patent literature 1).

FIG. 6 is a sequence diagram of a case in which a mobile telephone terminal installing such a server function is remotely operated. FIG. 6 shows a flow of a case in which a user B uses a server function of a mobile telephone terminal P owned by another user A using his/her mobile telephone terminal Q.

First, the user B notifies the user A that the user B desires to use the server function of the terminal P. The notification is made from the user B to the user A using means such as telephone or e-mail. Upon receiving the notification, the user A starts up the server function included in the terminal P using input means of the terminal P such as key buttons or a touch panel.

Next, the user A notifies the user B of access control information and that the user B is able to perform remote operation using means such as telephone or e-mail. The access control information is information required to access the server function of the terminal P, and includes, for example, information such as URL, IP address, port number, and authentication password.

The user B tries to access the server function of the terminal P based on the access control information that is notified. After that, access authentication processing is performed by access permission information management means included in the terminal P.

More specifically, the user A registers in advance information regarding another terminal that is allowed to access the server function of the terminal P by access permission setting means included in the terminal P. For example, such information may be a telephone number or an individual identification number of another terminal, and these information are recorded in a management table included in the access permission information management means. The access permission information management means refers to the management table to determine whether the terminal which has requested the access is a terminal that has access permission.

When authentication is successfully completed, the terminal P notifies the terminal Q of the access permission. Then, the terminal Q is able to use the server function of the terminal P.

As another related technique, Patent literature 2 discloses a system that allows a mobile telephone to remotely operate a video recorder connected to the Internet using e-mail, to make a recording reservation.

As another related technique, Patent literature 3 discloses a technique of changing settings of a mobile telephone terminal such as ring volume or an e-mail address from another terminal by remote operation. Further, Patent literature 4 discloses a technique in which a control server that performs control of controlled terminals allocates a remote control right to a remote control terminal to permit an exclusive remote control to the controlled terminals, thereby achieving the exclusive remote control.

CITATION LIST

Patent Literature

Patent literature 1: Japanese Unexamined Patent Application Publication No. 2002-300655
Patent literature 2: Japanese Unexamined Patent Application Publication No. 2009-146431
Patent literature 3: Japanese Unexamined Patent Application Publication No. 2005-198099
Patent literature 4: Japanese Unexamined Patent Application Publication No. 2003-116181

SUMMARY OF INVENTION

Technical Problem

However, the method of remotely operating the in-terminal server described above requires the user of the controlled-side terminal to start up the server function. This is due to the restriction that it is difficult to constantly operate the server function in mobile telephone terminals unlike large-scale computers.

More specifically, in a mobile telephone terminal, it is essentially required to minimize power consumption in terms of the original purpose of the terminal and the condition that the terminal is driven by battery. Accordingly, when the server function is installed in the mobile telephone terminal, such a configuration is required in which server execution time is reduced and the server is not executed when the mobile telephone terminal is not used. Further, in mobile telephone terminals with low processing capability compared to large-scale computer server devices, such a configuration is required in which the server function is not executed when not necessary also from the viewpoints that this reduces the possibility of attacks through networks and improves security.

When such a configuration is employed in which the server function is not constantly operated, the user of the controlled-side terminal himself/herself needs to start up the in-terminal server. This means that the user of the controlled-side terminal is forced to perform burdensome works and also means that it is difficult for the control-side terminal to start remote operation at a desired timing.

On the other hand, the configuration in which the server function is constantly operated leads to an increase in power consumption. According to this configuration, it is impossible to satisfy fundamental requests of the mobile telephone terminal or it increases possibility of Denial of Service (DoS) attacks through networks, which leads to bad effects on the whole terminal function.

Accordingly, when a server function is installed in personal information equipment such as a mobile telephone terminal, due to the specialty of the equipment, both of the configuration in which the server function is constantly operated and the configuration in which the user of the controlled-side terminal operates the server function only when use raise conflicting problems.

The present invention has been made in view of the aforementioned problems, and aims to provide a system which can start remote operation at any timing desired by the user of the control-side terminal without forcing the user of the controlled-side terminal to perform burdensome works while keeping low power consumption and high security.

Solution to Problem

A remote operation system according to the present invention is a remote operation system including a first mobile communication apparatus, a second mobile communication apparatus, and a relay apparatus, in which the first mobile communication apparatus includes transmission means for transmitting a remote operation request, the second mobile communication apparatus includes: server means; communication means; extraction means for extracting a control message related to control of the server means from messages received by the communication means; and control means for controlling the server means based on the control message, and the relay apparatus includes: reception means for receiving the remote operation request from the first mobile communication apparatus; storage means for associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; determination means for comparing the first identification information and the second identification information included in the permission information with the first identification information and the second identification information included in the remote operation request, respectively, to determine whether to allow the first mobile communication apparatus to remotely operate the second mobile communication apparatus; and transmission means for generating the control message to transmit the control message upon determination in the determination means that the remote operation is allowed.

Further, a relay apparatus according to the present invention includes: reception means for receiving a remote operation request from a first mobile communication apparatus; storage means for associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; determination means for comparing the first identification information and the second identification information included in the permission information with the first identification information and the second identification information included in the remote operation request, respectively, to determine whether to allow the first mobile communication apparatus to remotely operate the second mobile communication apparatus; and transmission means for generating a control message to transmit the control message upon determination in the determination means that the remote operation is allowed.

Further, a mobile communication apparatus according to the present invention includes: server means; communication means; extraction means for extracting a control message related to control of the server means from messages received by the communication means; and control means for controlling the server means based on the control message that is extracted.

Furthermore, an in-terminal server control method according to the present invention includes: a first extraction process that extracts, from messages of e-mail, SMS, and MMS, a control message related to start of remote operation; a first control process that performs control to start up an in-terminal server based on the extracted control message related to the start of the remote operation; a second extraction process that extracts, from messages of e-mail, SMS, and MMS, a control message related to end of the remote operation; and a second control process that performs control to stop the in-terminal server based on the extracted control message related to the end of the remote operation.

Furthermore, a relay processing method according to the present invention includes: a storing step that associates first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; a receiving step that receives a remote operation request; a determining step that compares the first identification information and the second identification information included in the remote operation request that is received with the permission information to determine whether to allow remote operation related to the received remote operation request; and a processing step that generates a control message based on the information included in the remote operation request to transmit the control message upon determination in the determining step that the remote operation is allowed, and discards the remote operation request upon determination in the determining step that the remote operation is not allowed.

Advantageous Effects of Invention

According to the present invention, it is possible for another terminal to use the server function by remote operation without requiring the user of the controlled-side terminal to perform burdensome works while mitigating problems of exhaustion of battery power due to power consumption and bad effects of DoS attacks on terminal functions due to an unauthorized request by a malicious third party.

BRIEF DESCRIPTION OF DRAWINGS

FIG. 2 is an example of permission information according to the first exemplary embodiment.

DESCRIPTION OF EMBODIMENTS

Figure 1:
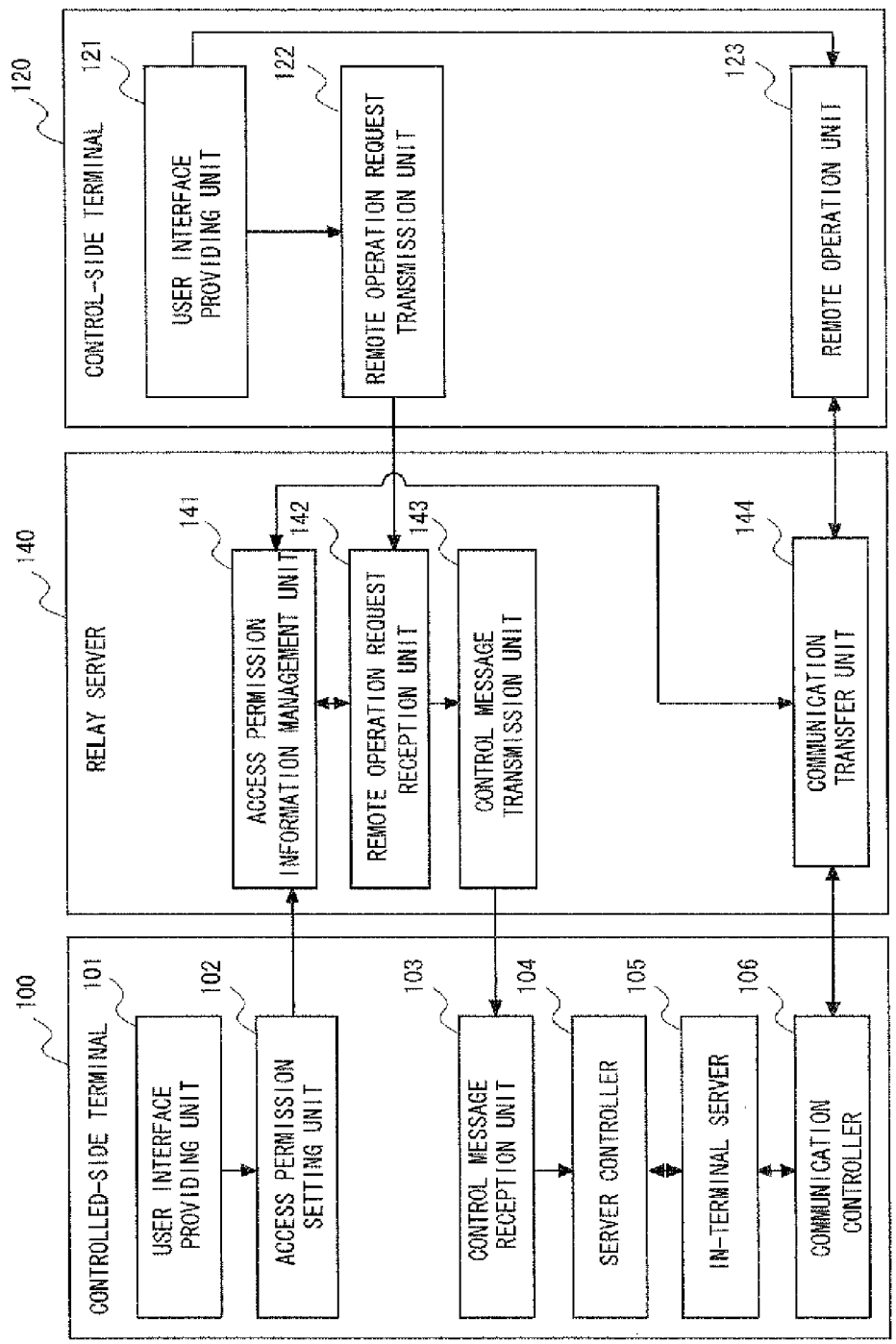
FIG. 1 is a block diagram of a remote operation system according to a first exemplary embodiment.

First, the outline of the present invention will be described. A remote operation system according to the present invention includes a first mobile communication apparatus serving as a control-side terminal that performs a remote operation, a second mobile communication apparatus serving as a controlled-side terminal which is remotely operated, and a relay apparatus serving as a relay server that is provided between the first and second mobile communication apparatuses.

The second mobile communication apparatus includes an in-terminal server and server control means for performing each control of start, stop, and changes in settings of the server. The server is often in a state in which it is not operated in terms of power consumption and the like, and the server is started or stopped according to the control regarding start or stop performed by the server control means.

When a user of the second mobile communication apparatus including the server function starts up the server function by himself/herself, the server control means starts the server based on a server start instruction input from the user through a user interface. On the other hand, when another person who is not the user of the second mobile communication apparatus uses the server function by remote operation, extraction means separately provided in the apparatus extracts a control message regarding start of the server from messages received by existing communication means, and the server control means starts the server based on the control message that is extracted.

In the remote operation system according to the present invention, a relay apparatus is arranged between the first mobile communication apparatus that performs remote operation and the second mobile communication apparatus that is remotely operated, and the relay apparatus transmits a control message to the second mobile communication apparatus. In the remote operation system according to the present invention, authentication processing which is required in a process of remote operation is performed by the relay apparatus that has relatively high processing capability, thereby being able to reduce the load on the apparatus which provides the server function.

Further, the remote operation system according to the present invention includes the server function in the second mobile communication apparatus. Thus, the first mobile communication apparatus is able to not only simply change settings of the second mobile communication apparatus but also remotely operate the server function. In short, results of executing various functions included in the apparatus and stored data are provided to a client by the server function included in the second mobile communication apparatus.

Hereinafter, the configuration of the present invention will be described in detail in each exemplary embodiment, in which the control-side terminal that performs remote operation is denoted by the first mobile communication apparatus, and the controlled-side terminal that is remotely operated is denoted by the second mobile communication apparatus.

(First Exemplary Embodiment)

Hereinafter, with reference to the drawings, exemplary embodiments of the present invention will be described. FIG. 1 is a block diagram of a remote operation system according to a first exemplary embodiment. This system roughly includes three components of a controlled-side terminal 100, a control-side terminal 120, and a relay server 140.

First, the controlled-side terminal 100 will be described.
The controlled-side terminal 100 includes a user interface providing unit 101, an access permission setting unit 102, a control message reception unit 103, a server controller 104, an in-terminal server 105, and a communication controller 106.

The user interface providing unit 101 receives input from a user by an input unit such as a touch panel or a numeric keypad. Further, the user interface providing unit 101 outputs output to the user from a display unit such as a screen or a voice output unit such as a speaker.

The access permission setting unit 102 is means for specifying the user that is allowed to perform remote operation by a method such as a telephone number or an e-mail address with which identification can be made to set the user in the relay server. The information regarding the user that is allowed to perform remote operation input from the user through the user interface providing unit 101 is transmitted to the relay server 140 by the access permission setting unit 102.

The control message reception unit 103 is means for receiving messages such as e-mail or Short Message Service (SMS) from the relay server 140 and extracting a control message of a format used for this system. The control message reception unit 103 passes the contents of the extracted control message to the server controller 104, and passes others to an existing mail reception application or the like.

The server controller 104 controls the state of the in-terminal server 105. More specifically, the server controller 104 performs control regarding operations such as start or stop of the in-terminal server 105 based on the contents of the control message extracted by the control message reception unit 103.

The in-terminal server 105 is server means for executing the function in the controlled-side terminal according to a request from the control-side terminal 120 that serves as a client, providing the result of executing the function to the control-side terminal 120, and providing various kinds of data stored in the controlled-side terminal to the control-side terminal 120. For example, upon receiving a request from the control-side terminal 120 to output position information, the in-terminal server 105 obtains the position information related to the current location using a GPS function included in the terminal to output the position information to the control-side terminal 120.

The communication controller 106 connects to the relay server 140, and passes the communication from the relay server 140 to the in-terminal server 105.

Next, the control-side terminal 120 will be described.

The control-side terminal 120 includes a user interface providing unit 121, a remote operation request transmission unit 122, and a remote operation unit 123.

The user interface providing unit 121 receives input from the user by an input unit such as a touch panel or a numeric keypad. Further, the user interface providing unit 121 outputs output to the user from a display unit such as a screen or a voice output unit such as a speaker.

The remote operation request transmission unit 122 transmits information for identifying the controlled terminal 100 which is to be remotely operated and information indicating the contents of remote operation that is requested to the relay server 140. Hereinafter, these information will be collectively referred to as a remote operation request. The contents of the remote operation that is requested includes an operation to start up the in-terminal server and an operation to stop the in-terminal server, for example. In particular, a remote operation request to start up the in-terminal server to start the remote operation is referred to as a remote operation start request, and a remote operation request to stop the in-terminal server to end the remote operation is referred to as a remote operation end request.

The remote operation unit 123 connects to the in-terminal server 105 through the communication transfer unit 144, to operate the function of the controlled-side terminal 100.

Next, the relay server 140 will be described.

The relay server 140 includes an access permission information management unit 141, a remote operation request reception unit 142, a control message transmission unit 143, and a communication transfer unit 144.

The access permission information management unit 141 stores permission information set by the access permission setting unit 102, and outputs permission information according to inquiry from the remote operation request unit 142 or the communication transfer unit 144.

The permission information includes a set of information with which each of the controlled-side terminal 100 or the controlled-side user and the control-side terminal 120 or the control-side user can be identified. Hereinafter, these information are called controlled-side identification information and control-side identification information, respectively.

FIG. 2 shows one example of the permission information. Both of the telephone number and the e-mail address are registered as the controlled-side identification information and the control-side identification information. Three different control-side users are associated with the same controlled-side user by management numbers N001 to N003. Further, information regarding a control-side user is registered in association with a second controlled-side user by a management number N004, and information regarding control-side users are registered in association with a third controlled-side user by management numbers N005 to N006. While a mobile telephone number, a terminal identification number or the like may be used as the information for identifying the terminal, a unique identifier for each terminal generated when the terminal is registered in the relay server may be used instead. Further, while an e-mail address or the like may be used as the information for identifying the user, as is similar to the information for identifying the terminal, a unique identifier that is generated when the user is registered in the relay server may be used instead. In this case, the uniqueness of these identifiers is guaranteed by the relay server.

Note that it is required to prevent each identification information from being disguised. If disguise can be performed only with the identification information, an individual password is prepared to prevent identification information of others from being used. Specifically, a password that is set in advance is also recorded in the permission information, and access authentication is performed using three sets of the controlled-side identification information, the control-side identification information, and the password.

The remote operation request reception unit 142 receives the remote operation request from the control-side terminal 120, and when the request is an access-permitted operation, notifies the control message transmission unit 143 of predetermined information.

The control message transmission unit 143 generates a control message according to the notification from the remote operation request reception unit 142 to transmit the control message to the controlled-side terminal 100. This control message is transmitted using existing communication means such as e-mail or SMS.

The reason why these communication means are used is that the controlled-side terminal represented by a mobile telephone terminal is a communication tool in the first place. Specifically, a sophisticated mobile telephone terminal including various applications generally includes functions and applications that are frequently used and functions and applications that are not frequently used. However, considering essential roles as the mobile telephone terminal as a communication tool, the communication functions such as a telephone function, an e-mail function, and an SMS function are functions that are expected to be constantly operated regardless of whether the mobile telephone terminal includes a server function. Based on this point, the control message is transmitted using e-mail or SMS. The control message transmission unit 143 adds information indicating that the message is transmitted from this remote operation system to e-mail or SMS so as to make it possible to identify whether the message is normal e-mail or SMS, or the control message of this system.

When being connected by the communication controller 106, the communication transfer unit 144 keeps this connection, and when being connected by the remote operation unit 123 of the control-side terminal 120 which is allowed to access the controlled-side terminal 100, transfers this connection to the connection that is kept.

Figure 3:
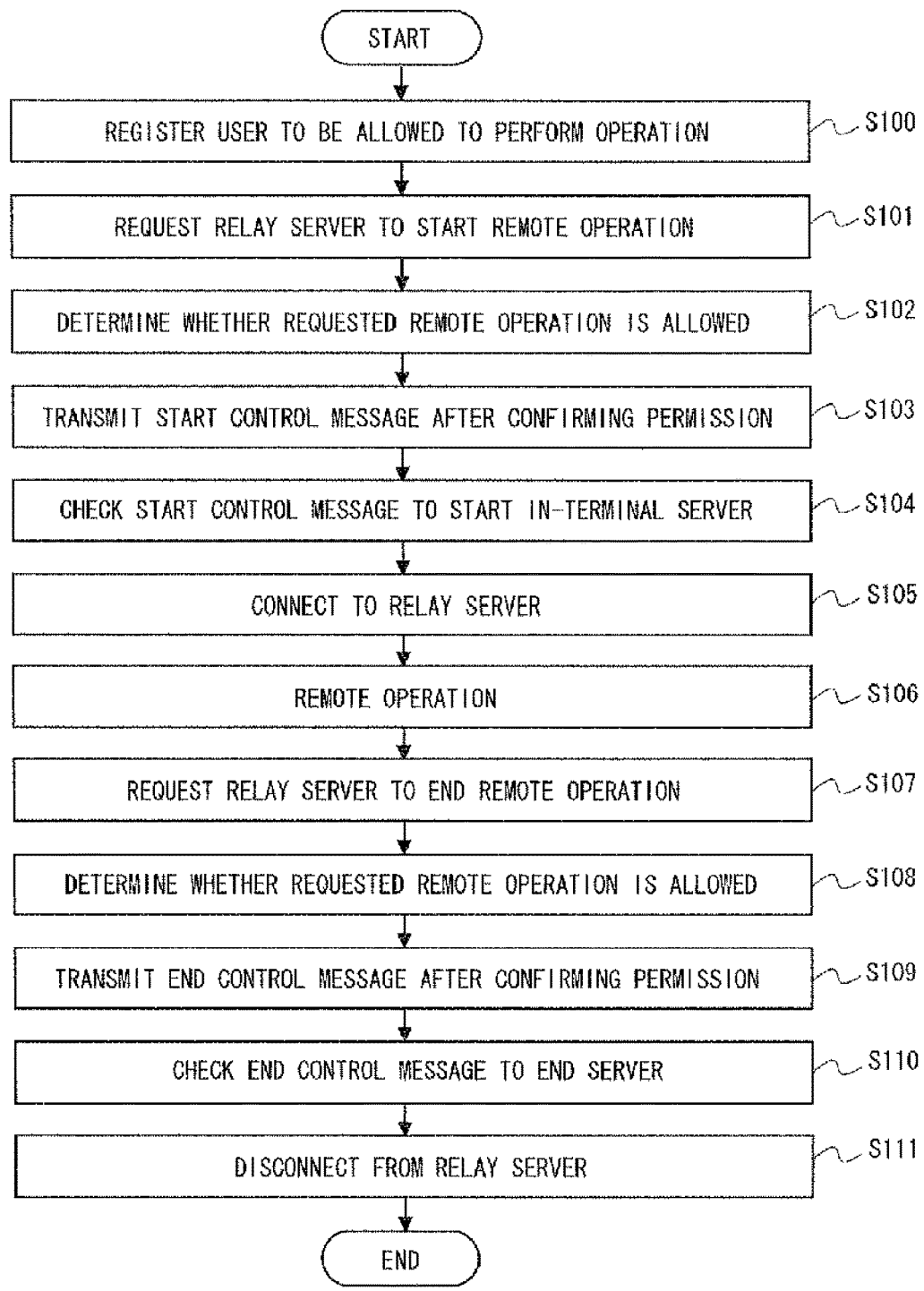
FIG. 3 is a flowchart showing an operation of the remote operation system according to the first exemplary embodiment.

Next, with reference to FIG. 1 and a flowchart shown in FIG. 3, an operation of the remote operation system according to the present invention will be described in detail.

First, the controlled-side terminal 100 registers a terminal or a user which is allowed to remotely operate this terminal in the relay server 140 (Step S100). This registration is performed by the user inputting its own controlled-side identification information and the control-side identification information of the terminal to be allowed through the user interface providing unit 101 and transmitting the information from the access permission setting unit 102 to the relay server 140. The access permission information management unit 141 stores these information as permission information regarding access authentication.

Next, the control-side terminal 120 requests remote operation to the relay server 140 (Step S101). More specifically, the remote operation request transmission unit 122 transmits the remote operation request to the relay server 140 based on the input from the user through the user interface providing unit 121. In this example, it is assumed that the contents of the remote operation that is requested is start of the remote operation. The remote operation request transmission unit 122 transmits the remote operation start request including the message indicating start of the remote operation, the control-side identification information of the control-side terminal, and the controlled-side identification information of the terminal of which the user desires to start remote operation to the remote operation request reception unit 142.

Next, the remote operation request reception unit 142 of the relay server 140 receives the remote operation request transmitted from the remote operation request transmission unit 122, to determine whether the set of the control-side identification information and the controlled-side identification information included in the remote operation request is allowed one (Step S102). The set of identification information is determined to be allowed when the same set of identification information is stored in the access permission information management unit 141.

More specifically, upon receiving the remote operation request, the remote operation request reception unit 142 outputs the controlled-side identification information included in the received remote operation request to the access permission information management unit 141. The access permission information management unit 141 outputs, based on the controlled-side identification information output from the remote operation request reception unit 142, permission information registered by the controlled-side terminal indicated by the information to the remote operation request reception unit 142. Specifically, the access permission information management unit 141 stores a plurality of pieces of permission information set by the respective controlled-side terminals and selects, from the plurality of pieces of permission information, the permission information corresponding to the controlled-side terminal information received from the remote operation request reception unit 142 to output the selected permission information to the remote operation request reception unit 142. The remote operation request reception unit 142 compares the set of the control-side identification information and the controlled-side identification information included in the permission information with the set of the control-side identification information and the controlled-side identification information included in the remote operation request, respectively,
to determine whether the remote operation is allowed. The access permission information management unit 141 may extract the control-side identification information included in the selected permission information to output the control-side identification information to the remote operation request reception unit 142, and the remote operation request reception unit 142 may compare the control-side identification information input from the access permission information management unit 141 with the control-side identification information included in the remote operation request.

When it is determined that the set of the control-side identification information and the controlled-side identification information is allowed as a result of the comparison, the remote operation request reception unit 142 notifies the control message transmission unit 143 of information required to transmit the control message. The information notified from the remote operation request reception unit 142 to the control message transmission unit 143 includes, in addition to the information regarding the control contents specified by the remote operation request, a telephone number or an e-mail address according to the method of transmitting the control message. When it is determined that the set of the control-side identification information and the controlled-side identification information is not allowed as a result of the comparison, the received remote operation request is discarded.

The control message transmission unit 143 generates the control message based on the notification from the remote operation request reception unit 142. Since the control contents specified by the remote operation request is start of the remote operation in this example, the control message transmission unit 143 generates a control message which is a message to request start of the remote operation to transmit the control message to the controlled-side terminal 100 (Step S103). As described above, the control message is transmitted using e-mail, SMS, or a similar communication function. The control message transmission unit 143 specifies the e-mail address or the telephone number notified from the remote operation request reception unit 142 as a destination address to transmit the control message.

Next, upon receiving the message by the control message reception unit 103, the controlled-side terminal 100 identifies whether the message is the control message transmitted from the control message transmission unit 143 of the relay server 140. The control message reception unit 103 handles other messages than the control message among the received messages as existing e-mail or SMS, and passes the messages to the corresponding application. Meanwhile, when the message is the control message, the control message reception unit 103 passes the control message to the server controller 104.

The server controller 104 determines the contents of the control message received from the control message reception unit 103 to perform control such as start or stop of the in-terminal server 105 (Step S104). Since the control message relates to start of the remote operation in this example, the server controller 104 performs control to start up the in-terminal server 105.

Next, the communication controller 106 confirms start of the in-terminal server 105, and then connects to the relay server 140. When being connected by the communication controller 106, the communication transfer unit 144 of the relay server 140 checks the connection source and keeps the connection when the connection source is the controlled-side terminal which is registered in the access permission information management unit 141. The relay server 140 rejects the connection when the connection source is not registered. Further, the remote operation unit 123 of the control-side terminal 120 connects to the relay server 140. When this connection is made, the communication transfer unit 144 checks the connection source. When the connection source is the control-side terminal which is registered in the access permission information management unit 141, the communication transfer unit 144 transfers this connection to the connection of the controlled-side terminal which makes a set. When the connection source is not registered, the communication transfer unit 144 refuses the connection (Step S105).

Next, the control-side terminal 120 connects to the in-terminal server 105 of the controlled-side terminal 100 using the connection transferred through the relay server 140, to remotely operate the function of the controlled-side terminal 100 (Step S106). The control-side terminal 120 notifies the controlled-side terminal 100 of the function of the controlled-side terminal 100 which is desired to be executed and the execution contents through the relay server 140, and the in-terminal server 105 causes necessary functions to be executed according to the contents of notification from the control-side terminal 120 input through the communication controller 106. The in-terminal server 105 outputs the information that is obtained as a result of the execution, and transmits the information to the control-side terminal 120 from the communication controller 106 through the relay server 140. The in-terminal server 105 further includes a function as an information server which provides information stored in the terminal according to the request from the control-side terminal 120.

When the remote operation is ended, the control-side terminal 120 requests the relay server 140 to end the remote operation (Step S107). The remote operation request transmission unit 122 transmits a remote operation end request including the message indicating end of the remote operation, the control-side identification information of the control-side terminal, and the controlled-side identification information of the terminal of which the user desires to end the remote operation to the relay server 140.

Next, the remote operation request reception unit 142 of the relay server 140 receives the remote operation end request which is information related to end of the remote operation transmitted from the remote operation request transmission unit 122 to determine whether the set of the control-side identification information and the controlled-side identification information included in the remote operation end request is allowed one (S108). Whether the set of the identification information is allowed is determined by the remote operation request reception unit 142, as is similar to the determination processing at the time of start of the remote operation described above. The remote operation request reception unit 142 determines that the set of the identification information is allowed when the set of the identification information included in the remote operation end request is also stored in the access permission information management unit 141 as permission information. When the remote operation end request regarding end of the remote operation is allowed as a result of the determination processing, the remote operation request reception unit 142 notifies the control message transmission unit 143 of predetermined information. The notified information includes information regarding the end of the remote operation, and the telephone number or the e-mail address of the controlled-side terminal.

Upon receiving notification regarding end of the remote operation from the remote operation request reception unit 142, the control message transmission unit 143 generates a control message which is a message to request end of the remote operation to transmit the control message to the controlled-side terminal 100 (Step S109).

Next, upon receiving the message by the control message reception unit 103, the controlled-side terminal 100 identifies whether this message is the control message that is transmitted from the control message transmission unit 143. Other messages than the control message are handled as existing e-mail or SMS, and are passed to the corresponding application. Meanwhile, the control message is passed to the server controller 104.

The server controller 104 determines from the contents of the control message that the control message is the notification regarding the end of the remote operation, to perform control to stop the in-terminal server 105 and end the remote operation (Step S110).

Next, the communication controller 106 disconnects the connection with the relay server 140 after confirming the end of the in-terminal server 105. When being disconnected by the communication controller 106, the communication transfer unit 144 disconnects the connection with the remote operation unit 123 (Step S111).

As described above, the remote operation system according to the present invention is configured to transmit the remote operation request from the control-side terminal, check by the relay server whether the request is allowed, and transmit the control message regarding the remote operation to the controlled-side terminal only when it is allowed. Accordingly, since unnecessary messages are not delivered to the controlled-side terminal, it is possible to prevent an increase in message identification processing carried out in the controlled-side terminal while preventing remote operations from unauthorized terminals or users.

Further, since the control message regarding start of the server is transmitted or received using the communication means such as e-mail or SMS which is essentially included in the controlled-side terminal, which eliminates the need to perform new communication to wait for the control message. Accordingly, it is possible to reduce communication of the controlled-side terminal and to reduce power consumption.

Various applications may be supposed as the services that can be provided by the in-terminal server, and many of them require immediacy. For example, a parent who desires to confirm the safety of his/her child need to immediately acquire the current location of the child. In another case, a user may suddenly desire to view photos stored in a terminal of a friend to kill time. In such a case, it is quite inconvenient if it takes several tens of minutes before viewing. However, according to the present invention, e-mail or SMS which is the communication function originally included in the controlled-side terminal is used to transmit and receive the control messages. Therefore, the control-side terminal is able to start remote operation at a desired timing.

When e-mail is used as the communication means of the control messages, push e-mail is preferably used. Since polling e-mail is configured so that an e-mail client in the terminal accesses the mail server at regular time intervals, a time lag may occur from when a control message is transmitted from the relay server by e-mail until when the server is operated by the controlled-side terminal. However, when the push e-mail is used, a control message transmitted by the relay server is forcibly delivered to the controlled-side terminal without waiting for the cyclic operation by the e-mail client, thereby being able to suppress the time lag from transmission of the remote operation request to start of the server.

The communication means is not limited to e-mail or SMS stated above, but may be multimedia messaging service (MMS), enhanced messaging service (EMS), or other communication means that are included in the controlled-side terminal as the communication functions.

Furthermore, the remote operation system according to the first exemplary embodiment is configured to be able to end the server of the controlled-side terminal by remote operation from the control-side terminal to end the use of the server function.

The user of the controlled-side terminal allows a predetermined third party to use the server function at some expense of consumption of battery of his/her terminal and reduction in processing speed. Accordingly, it is desired for a person who is allowed to use the server function to end the server function after use as a matter of courtesy. This is because keeping the server function operated even after use not only leads to power consumption but also meaninglessly increases possibility of attacks from a third party. According to the present invention, it is possible to end the server function from the control-side terminal through the remote operation end request even when the user of the controlled-side terminal does not perform end processing by himself/herself, whereby the user of the controlled-side terminal is able to allow a third party to use the server function without anxiety.

The controlled-side terminal 100 may be configured to be able to end the server function under a predetermined condition even when it does not receive the control message regarding end of the remote operation. For example, the controlled-side terminal 100 newly includes a timer function which is means for measuring time. Upon receiving a control message to instruct start of the server function, the server controller 104 starts the timer function at the same time when the server control unit 104 starts up the in-terminal server 105. The server controller 104 performs control to end the server after a lapse of a predetermined period of time from start of the server. As stated above, the controlled-side terminal 100 may include a first server stop means for stopping the server based on the control message regarding the end of the remote operation from the outside of the terminal and a second server stop means for stopping the server after a lapse of a predetermined period of time using the timer function included in the terminal itself. According to this configuration, for example, even when the user of the control-side terminal 120 fails to request end of the remote operation, the controlled-side terminal is able to stop the server appropriately on its own determination without troubling the user.

The server controller 104 may be configured to clear the value of the timer each time communication is performed through the communication controller 106 and end the server function after a lapse of a predetermined period of time from the last communication.

Further, the time set by the timer may be varied depending on the functions to be used. For example, the user of the control-side terminal 120 who would like to know the current location of the user of the controlled-side terminal 100 only desires to acquire position information; thus no problem occurs even when the server operation time is short. Meanwhile, the server is preferably operated for a long time for a user of the control-side terminal who desires to view photos. As stated above, since the time during which the server is operated varies depending on the required services, the server controller 104 may perform control of setting different timer values depending on the functions to be used and ending the in-terminal server after a lapse of a predetermined period of time. According to this configuration, it is possible to further reduce the unnecessary server operation time.

While described above is the configuration in which the permission information stored in the access permission information management unit 141 of the relay server 140 is registered using the access permission setting means of the controlled-side terminal, it is not limited to this. Such a configuration may also be employed in which the user of the controlled-side terminal accesses the relay server using a third communication apparatus, thereby being able to register the permission information. However, in such a case, the relay server need to include a second authentication function to authenticate the authorized user of the controlled-side terminal when the user registers the permission information so as to prevent a situation in which a third party who falsely identify himself/herself as the owner of the controlled-side terminal registers the permission information in the controlled-side terminal.

While described above is the case in which the authentication processing in the relay server 140 is performed by the remote operation request reception unit 142, it is not limited to this. An access authentication processing unit that performs dedicated processing may be separately provided. The access authentication processing unit may receive the remote operation request received by the remote operation request reception unit 142 and the permission information stored in the access permission information management unit 141, and compare the control-side identification information and the controlled-side identification information included in each of the remote operation request and the permission information to perform authentication processing.

(Second Exemplary Embodiment)

The invention according to a second exemplary embodiment relates to a remote operation system when one control-side terminal remotely operates a plurality of controlled-side terminals through a relay apparatus.

Figure 4:
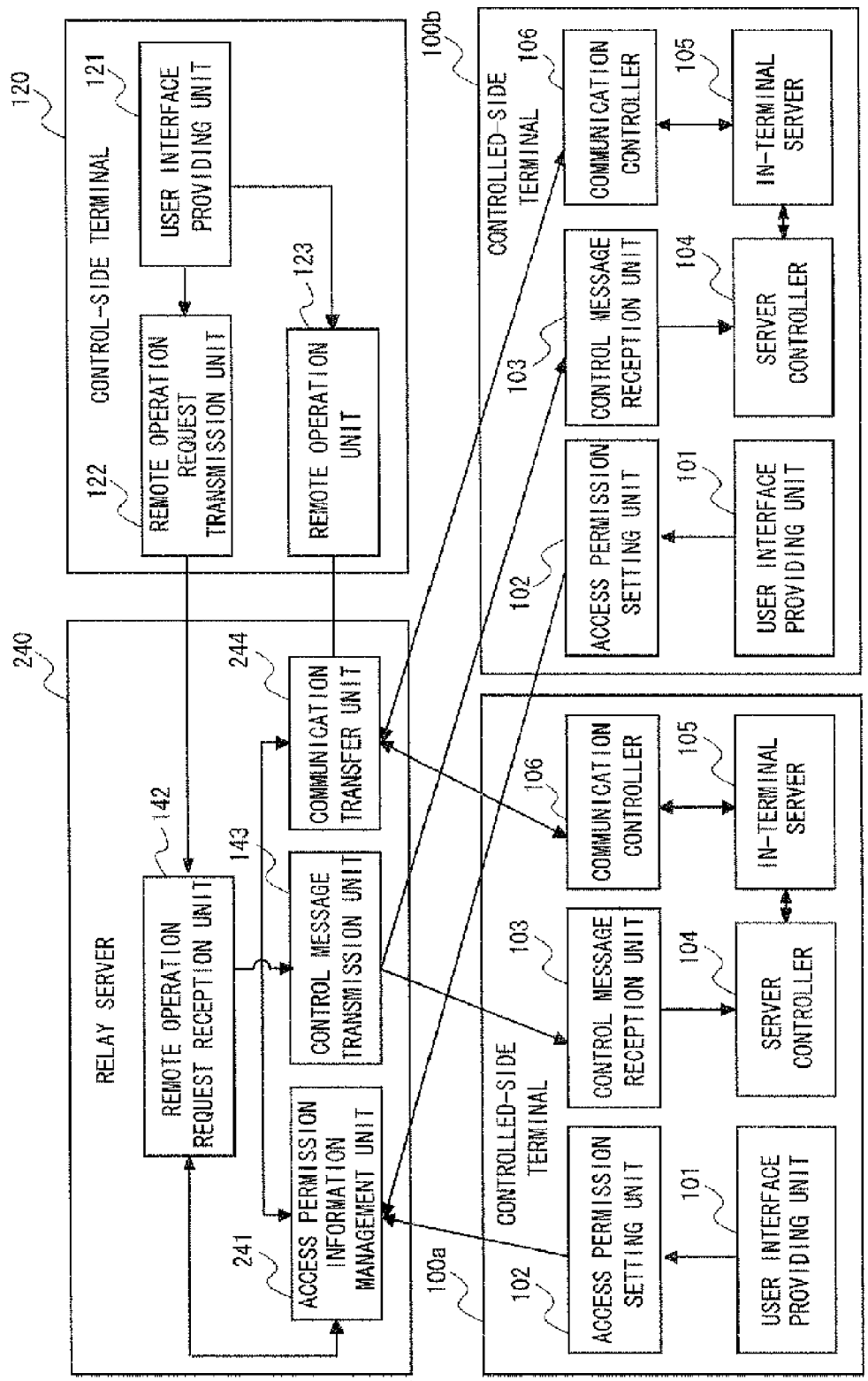
FIG. 4 is a block diagram of a remote operation system according to a second exemplary embodiment.

FIG. 4 is a block diagram of the remote operation system according to the second exemplary embodiment of the present invention. The remote operation system according to this exemplary embodiment includes a plurality of controlled-side terminals 100a and 100b, a relay server 240, and a control-side terminal 120. The remote operation system according to this exemplary embodiment is different from the remote operation system according to the first exemplary embodiment in that it includes a plurality of controlled-side terminals. Furthermore, the function of the access permission information management means of the relay server 240 and the function of the communication transfer means are also different. Hereinafter, a configuration and an operation of each apparatus will be described. Description of the components same to those in the first exemplary embodiment will be partially omitted.

An access permission information management unit 241 of the relay server 240 stores and manages in-use flags indicating whether each of permission information is being used in addition to the permission information managed by the access permission information management unit 141 according to the first exemplary embodiment.

When the remote operation request reception unit 142 receives a remote operation request and this is a start request that is allowed, the access permission information management unit 241 sets an in-use flag to "ON". When the remote operation request is an end request that is allowed, the access permission information management unit 241 sets the in-use flag to "OFF".

When being connected by the communication controllers 106 of the respective controlled-side terminals, a communication transfer unit 244 of the relay server 240 keeps these connections at the same time, and stores the connection states in association with the identification information of the respective controlled-side terminals that are connection sources. When being connected by the remote operation unit 123, the communication transfer unit 244 inquires of the access permission information management unit 240 for the controlled-side terminals (connection destinations) that the control-side terminal 120 (connection source) is allowed to access, and acquires identification information related to the controlled-side terminal whose in-use flag is "ON". The communication transfer unit 244 searches the identification information of the controlled-side terminal from the information set that is stored and selects the connection that is kept. The communication transfer unit 244 transfers the connection from the remote operation unit 123 to this connection.

According to the configuration stated above, the communication unit 244 included in the relay server is able to select the connection transfer destination from the plurality of controlled-side terminals, whereby one control-side terminal is able to remotely operate the plurality of controlled-side terminals.

Figure 5:
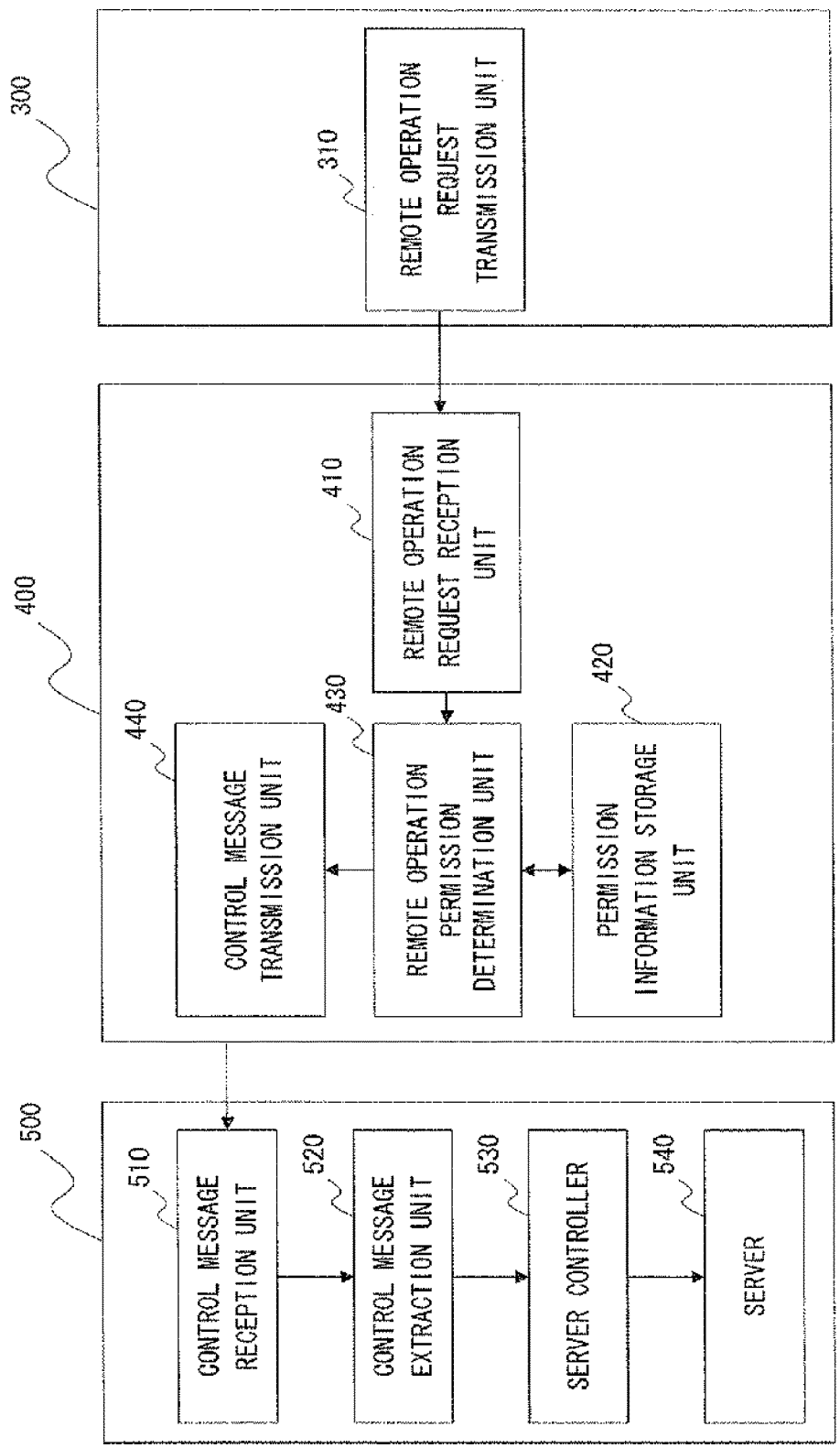
FIG. 5 is a block diagram of a remote operation system according to the present invention.
Figure 6:
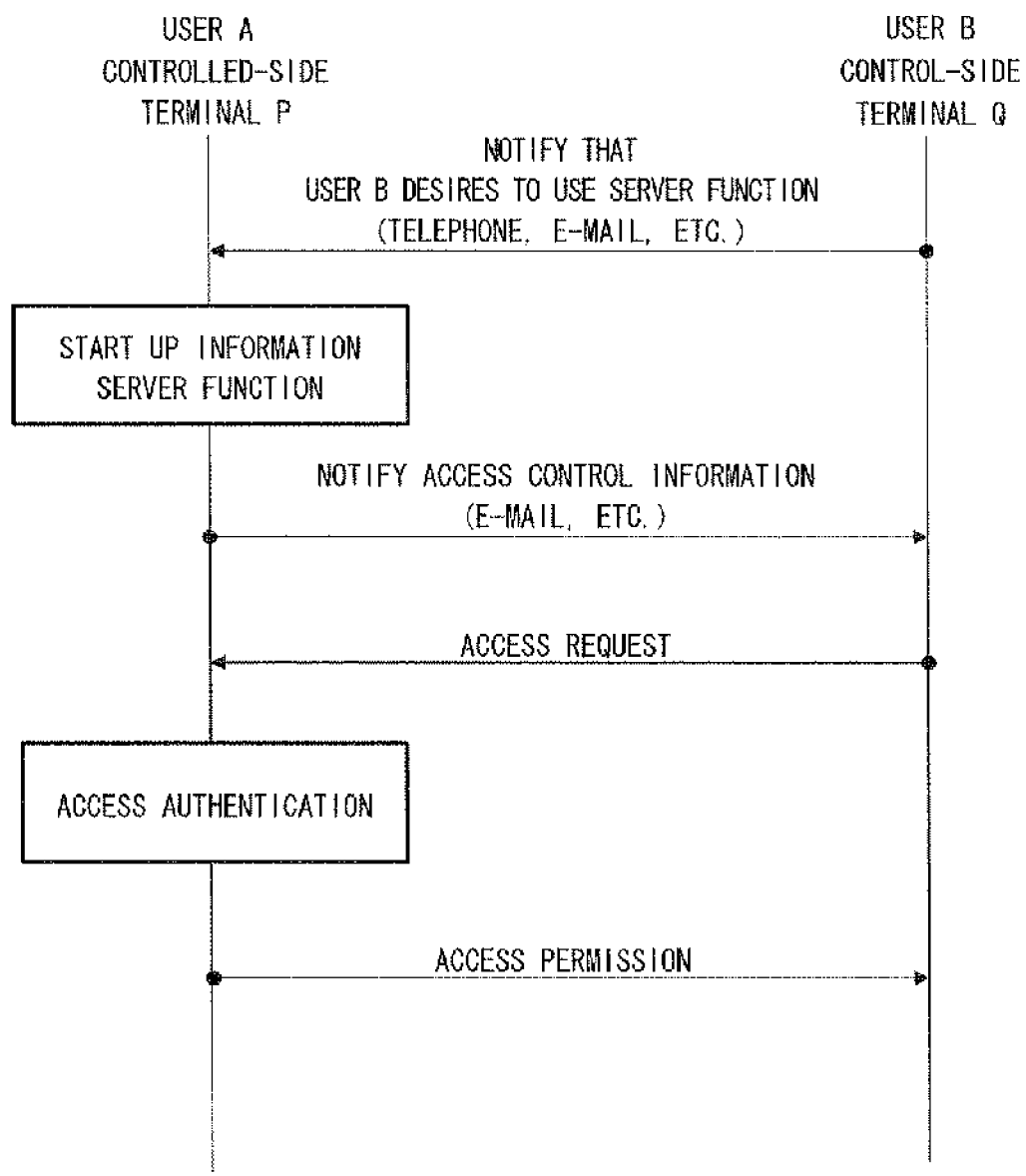
FIG. 6 is a sequence diagram showing procedures to start up an in-terminal server of a remote operation system according to a related art.

As described in each of the exemplary embodiments, the remote operation system according to the present invention may be configured as shown in FIG. 5. In FIG. 5, the remote operation system according to the present invention includes a first mobile communication apparatus 300 which serves as a control-side apparatus, a relay apparatus 400, and a second mobile communication apparatus 500 which serves as a controlled-side apparatus.

The first mobile communication apparatus 300 includes a remote operation request transmission unit 310 that transmits a remote operation request that makes a request to start remote operation.

The relay apparatus 400 includes a remote operation request reception unit 410, a permission information storage unit 420, a remote operation permission determination unit 430, and a control message transmission unit 440.

The remote operation request reception unit 410 receives the remote operation request transmitted from the first mobile communication apparatus 300.

The permission information storage unit 420 associates first identification information related to a controlled-side communication apparatus or a controlled-side user that is remotely operated with second identification information related to a control-side communication apparatus or a control-side user that remotely operates the controlled-side communication apparatus, to store the first identification information in association with the second identification information as permission information. In this example, the first mobile communication apparatus 300 and the user of the first mobile communication apparatus 300 correspond to the control-side communication apparatus and the control-side user, and the second mobile communication apparatus 500 and the user of the second mobile communication apparatus 500 correspond to the controlled-side communication apparatus and the controlled-side user.

The remote operation permission determination unit 430 refers to the permission information stored in the permission information storage unit 420, and compares the first identification information and the second identification information included in the permission information with the first identification information and the second identification information included in the remote operation request received by the remote operation request reception unit 410, respectively. The remote operation permission determination unit 430 then determines whether to allow the first mobile communication apparatus 300 to remotely operate the second mobile communication apparatus 500.

Upon determination in the remote operation permission determination unit 430 that the remote operation is allowed, the control message transmission unit 440 generates a control message for remote operation to transmit the control message. The control message is a message to control a server function included in the second mobile communication apparatus 500, and includes necessary information to instruct start or end the server, or other control. The control message is used in a mobile communication system, and is transmitted by a communication method such as e-mail or SMS which is an application that is constantly operated in the mobile communication apparatus.

The second mobile communication apparatus 500 includes a control message reception unit 510, a control message extraction unit 520, a server controller 530, and a server (service providing unit) 540.

The control message reception unit 510 is communication means that receives the control message transmitted from the control message transmission unit 440 of the relay apparatus 400 in the same manner as other normal messages. A central processing unit (CPU) provided inside the apparatus executes a program corresponding to the method of transmitting or receiving the control message such as an e-mail application or an SMS application to receive the control message.

The control message extraction unit 520 extracts, from the messages received by the control message reception unit 510, the control message.

The server controller 530 controls the server 540 based on the contents of the control message extracted by the control message extraction unit 520. More specifically, when the extracted control message is the control message which instructs to start up the server 530, the server controller 530 starts the server 540, whereby services can be provided based on access from the outside.

The server 540 is a server provided in the terminal, and provides various services according to the control from the server controller 530.

As described above, in the remote operation system according to each of the exemplary embodiments of the present invention, it is possible to achieve remote operation without requiring the user of the controlled-side terminal to perform burdensome works while mitigating problems of exhaustion of battery power due to power consumption and bad effects of DoS attacks on terminal functions due to an unauthorized request by a malicious third party.

Furthermore, according to the present invention, it is determined in the relay server whether to allow access and the control message is not transmitted to the controlled-side terminal without permission, thereby being able to reduce communication and processing of the controlled-side terminal and to reduce power consumption.

The present invention is not limited to the exemplary embodiments stated above, but may be changed as appropriate without departing from the spirit of the present invention. For example, each processing in each apparatus stated above including the relay server, the control-side terminal, and the controlled-side terminal may be achieved using a program which causes an information processing apparatus such as a CPU to execute the aforementioned processing.

The program can be stored in various types of storage media that can be accessed by a computer system. The program may be transmitted via communication media. The communication media include, for example, flexible disks, hard disks, magnetic discs, magneto-optical disks, CD-ROM, DVD, ROM cartridges, RAM memory cartridges with battery backup function, flash memory cartridges, and non-volatile RAM cartridges. Further, the communication media include a wired communication media (e.g. telephone lines) or a wireless communication media (e.g. microwave lines), and also include the Internet.

While described above is the case in which all the control messages are transmitted from one relay server in the remote operation system, it is not limited to this. Such a configuration may be employed in which the remote operation system includes a plurality of relay servers and the controlled-side terminal extracts, from the received messages, a control message transmitted from the relay server that is registered to control the in-terminal server.

Further, some control-side terminals may be configured to be able to directly transmit control messages to controlled-side terminals. Specifically, the controlled-side terminal may be configured to extract only the control message transmitted from the relay server and the control-side terminal that are registered to control the in-terminal server. Most of the processing of authenticating the control-side terminal may be performed by the relay server, thereby reducing the amount of processing carried out in the controlled-side terminal. Further, some terminals may be configured to be able to directly transmit control messages, thereby achieving flexible operations.

Further, the present invention may have the following forms in this aspect.

(1) A remote operation system comprising a first mobile communication apparatus, a second mobile communication apparatus, and a relay apparatus, wherein the first mobile communication apparatus comprises transmission means for transmitting a remote operation request, the second mobile communication apparatus comprises: server means; communication means; extraction means for extracting a control message related to control of the server means from messages received by the communication means; and control means for controlling the server means based on the control message, and the relay apparatus comprises: reception means for receiving the remote operation request from the first mobile communication apparatus; storage means for associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; determination means for comparing the first identification information and the second identification information included in the permission information with the first identification information and the second identification information included in the remote operation request, respectively, to determine whether to allow the first mobile communication apparatus to remotely operate the second mobile communication apparatus; and transmission means for generating the control message to transmit the control message upon determination in the determination means that the remote operation is allowed.

(2) The remote operation system according to (1), wherein the transmission means included in the relay apparatus transmits the control message using e-mail, SMS, or MMS, and the determination means included in the second mobile communication apparatus extracts, from e-mail, SMS, or MMS received by the communication means, e-mail, SMS, or MMS including the control message to output the extracted one to the control means.

(3) The remote operation system according to (1) or (2), wherein the transmission means included in the first mobile communication apparatus transmits a remote operation request related to end of the remote operation, the transmission means included in the relay apparatus generates a control message related to the end of the remote operation to transmit the control message, and the control means included in the second mobile communication apparatus performs control to end the server means based on the control message related to the end of the remote operation.

(4) A relay apparatus comprising: reception means for receiving a request for remote operation sent from a first mobile communication apparatus to a second mobile communication apparatus; storage means for associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; determination means for comparing the first identification information and the second identification information included in the permission information with the first identification information and the second identification information included in the remote operation request, respectively, to determine whether to allow the first mobile communication apparatus to remotely operate the second mobile communication apparatus; and transmission means for generating a control message to transmit the control message upon determination in the determination means that the remote operation is allowed.

(5) The relay apparatus according to (4), wherein the transmission means transmits the control message using any one of e-mail, SMS, and MMS.

(6) The relay apparatus according to (4), wherein the storage means newly stores use flag information, and the storage means sets the corresponding use flag information to ON based on the remote operation request related to start of the server and sets the use flag information to OFF based on the remote operation request related to end of the server.

(7) A mobile communication apparatus comprising: server means; communication means; extraction means for extracting a control message related to control of the server means from messages received by the communication means; and control means for controlling the server means based on the control message that is extracted.

(8) The mobile communication apparatus according to (7), wherein the control means starts the server means in a case in which the control message is a message related to start of the server means and ends the server means in a case in which the control message is a message related to stop of the server means.

(9) The mobile communication apparatus according to (7) or (8), further comprising timer means for measuring time, and the control means performs control to cause the timer means to start measuring time based on the control message related to the start of the server means, and performs control to stop the server means after a lapse of a predetermined period of time.

(10) The mobile communication apparatus according to (9), wherein the timer means sets the predetermined period of time to different times depending on functions to be remotely operated.

(11) A server control method comprising: a first extraction process that extracts, from messages of e-mail, SMS, and MMS, a control message related to start of remote operation; a first control process that performs control to start up an in-terminal server based on the extracted control message related to the start of the remote operation; a second extraction process that extracts, from messages of e-mail, SMS, and MMS, a control message related to end of the remote operation; and a second control process that performs control to stop the in-terminal server based on the extracted control message related to the end of the remote operation.

(12) A relay processing method comprising: a storing step that associates first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information; a receiving step that receives a remote operation request; a determining step that compares the first identification information and the second identification information included in the remote operation request that is received with the permission information to determine whether to allow remote operation related to the received remote operation request; and a processing step that generates a control message based on the information included in the remote operation request to transmit the control message upon determination in the determining step that the remote operation is allowed, and discards the remote operation request upon determination in the determining step that the remote operation is not allowed.

This application is based upon and claims the benefit of priority from Japanese Patent Application No. 2011-021638, filed on Feb. 3, 2011, the disclosure of which is incorporated herein in its entirety by reference.

INDUSTRIAL APPLICABILITY

The present invention can be used in various radio communication systems such as Long Term Evolution (LTE).

REFERENCE SIGNS LIST

100 CONTROLLED-SIDE TERMINAL
101 USER INTERFACE PROVIDING UNIT
102 ACCESS PERMISSION SETTING UNIT
103 CONTROL MESSAGE RECEPTION UNIT
104 SERVER CONTROLLER
105 IN-TERMINAL SERVER
106 COMMUNICATION CONTROLLER
120 CONTROL-SIDE TERMINAL
121 USER INTERFACE PROVIDING UNIT
122 REMOTE OPERATION REQUEST TRANSMISSION UNIT
123 REMOTE OPERATION UNIT
140 RELAY SERVER
141 ACCESS PERMISSION INFORMATION MANAGEMENT UNIT
142 REMOTE OPERATION REQUEST RECEPTION UNIT
143 CONTROL MESSAGE TRANSMISSION UNIT
144 COMMUNICATION TRANSFER UNIT
240 RELAY SERVER
241 ACCESS PERMISSION INFORMATION MANAGEMENT UNIT
244 COMMUNICATION TRANSFER UNIT
300 FIRST MOBILE COMMUNICATION APPARATUS
310 REMOTE OPERATION REQUEST TRANSMISSION UNIT
400 RELAY APPARATUS
410 REMOTE OPERATION REQUEST RECEPTION UNIT
420 ACCESS PERMISSION INFORMATION STORAGE UNIT
430 REMOTE OPERATION PERMISSION DETERMINATION UNIT
440 CONTROL MESSAGE TRANSMISSION UNIT
500 SECOND MOBILE COMMUNICATION APPARATUS
510 CONTROL MESSAGE RECEPTION UNIT
520 CONTROL MESSAGE EXTRACTION UNIT
530 SERVER CONTROLLER
540 SERVER

The invention claimed is:

1. A remote operation system comprising a first mobile communication apparatus, a second mobile communication apparatus, and a relay apparatus, wherein
the first mobile communication apparatus comprises a transmitter configured to transmit a remote operation request,
the second mobile communication apparatus comprises:
a processor; and
a memory that stores instructions to be executed by the processor by causing the processor to execute:
a storage configured to store information;
a server configured to be remotely operated by the first mobile communication apparatus and, configured to execute a function according to a request from the first mobile communication apparatus to provide a result of executing the function to the first mobile communication apparatus through the relay apparatus, or configured to provide information stored in the storage to the first mobile communication apparatus through the relay apparatus according to the request from the first mobile communication apparatus;
a communicator;
an extractor configured to extract a control message related to control of the server from messages received by the communicator; and
a controller configured to control the server based on the control message, and
the relay apparatus comprises:
a receiver configured to receive the remote operation request from the first mobile communication apparatus;
a storage configured to associate first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information;
a comparator configured to compare the first identification information and the second identification information included in the permission information with the first identification information and the second identification information included in the remote operation request, respectively, to determine whether to allow the first mobile communication apparatus to remotely operate the second mobile communication apparatus; and
a transmitter configured to generate the control message to transmit the control message upon determining, in the comparator, that the remote operation is allowed,
wherein the storage is configured to newly store use flag information, and the storage is configured to set the corresponding use flag information to ON based on the remote operation request related to a start of the server and configured to set the use flag information to OFF based on the remote operation request related to an end of the server,
wherein the communicator is configured to receive the control message and is configured to be constantly operated regardless of whether the server is operated, and
wherein the controller is configured to control the start of the server when the control message regarding the start of the server is extracted.

2. The remote operation system according to claim 1, wherein
the transmitter included in the relay apparatus is configured to transmit the control message using any one of e-mail, SMS, and MMS, and
the extractor included in the second mobile communication apparatus is configured to extract, from e-mail, SMS, or MMS received by the communicator, e-mail, SMS, or MMS including the control message to output controller.

3. The remote operation system according to claim 1, wherein:
the transmitter included in the first mobile communication apparatus transmits a remote operation request related to end of the remote operation,
the transmitter included in the relay apparatus generates a control message related to the end of the remote operation based on the remote operation request related to the end of the remote operation to transmit the control message, and
the controller included in the second mobile communication apparatus performs control to end the server based on the control message related to the end of the remote operation.

4. A relay apparatus comprising:
a processor; and
a memory that stores instructions to be executed by the processor by causing the processor to execute:
a receiver configured to receive a request for remote operation sent from a first mobile communication apparatus to a second mobile communication apparatus;
a storage configured to associate first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information;
a comparator configured to compare the first identification information and the second identification information included in the permission information with the first identification information and the second identification information included in the remote operation request, respectively, to determine whether to allow the first mobile communication apparatus to remotely operate a server of the second mobile communication apparatus, wherein the server is configured to execute a function according to a request from the first mobile communication apparatus to provide a result of executing the function to the first mobile communication apparatus through the relay apparatus, or configured to provide information stored in the storage to the first mobile communication apparatus through the relay apparatus according to the request from the first mobile communication apparatus; and
a transmitter configured to generate a control message regarding a start of the server of the second mobile communication apparatus to transmit the control message upon determining, in the comparator, that the remote operation is allowed,
wherein the storage is configured to newly store use flag information, and the storage is configured to set the corresponding use flag information to ON based on the remote operation request related to the start of the server and configured to set the use flag information to OFF based on the remote operation request related to an end of the server.

5. The relay apparatus according to claim 4, wherein the transmitter is configured to transmit the control message using any one of e-mail, SMS, and MMS.

6. A mobile communication apparatus comprising:
a processor; and
a memory that stores instructions to be executed by the processor by causing the processor to execute:
a storage configured to store information;
a server configured to be remotely operated by another mobile communication apparatus and, configured to execute a function according to a request from the another mobile communication apparatus to provide a result of executing the function to the another mobile communication apparatus through a relay apparatus, or configured to provide information stored in the storage to the another mobile communication apparatus through the relay apparatus according to the request from the another mobile communication apparatus;
a communicator;
an extractor configured to extract a control message related to control of the server from messages received by the communicator;
a controller configured to control the server based on the control message that is extracted; and
a timer configured to measure time,
wherein the communicator is configured to receive the control message and is configured to be constantly operated regardless of whether the server is operated,
wherein the controller is configured to control a start of the server when the control message regarding the start of the server is extracted, and wherein the controller is configured to perform control to cause the timer to start measuring time based on the control message related to the start of the server and configured to perform control to stop the server after a lapse of a predetermined period of time, and the timer is configured to set the predetermined period of time to different times depending on functions to be remotely operated.

7. The mobile communication apparatus according to claim 6, wherein the extractor is configured to extract, from e-mail, SMS, or MMS received from the communicator, the control message related to control of the server.

8. An in-terminal server control method comprising:
extracting, from any one of messages of e-mail, SMS, and MMS, a control message related to start of remote operation;
performing control to start up an in-terminal server based on the extracted control message related to the start of the remote operation,
remotely operating the in-terminal server by another terminal and, the in-terminal server executing a function according to a request from the another terminal to provide a result of executing the function to the another terminal through a relay apparatus, or providing information stored in a terminal having the in-terminal server to the another terminal through the relay apparatus according to the request from the another terminal;
extracting, from messages of e-mail, SMS, and MMS, a control message related to end of the remote operation; and
performing control to cause a timer to start measuring time based on the control message related to a start of the remote operation and performing control to stop the in-terminal server after a lapse of a predetermined period of time,
and setting the precleterniined period of time to different times depending on functions to be remotely operated.

9. A relay processing method comprising:
associating first identification information related to a controlled-side communication apparatus or a controlled-side user that is remotely operated with second identification information related to a control-side communication apparatus or a control-side user that remotely operates the controlled-side communication apparatus to store the first identification information in association with the second identification information as permission information;
receiving a remote operation request;
comparing the first identification information and the second identification information included in the remote operation request that is received with the permission information to determine whether to allow remote operation related to the received remote operation request;
generating a control message regarding a start of a server of the controlled-side communication apparatus based on the information included in the remote operation request to transmit the control message upon determination in the determining that the remote operation is allowed, and discarding the remote operation request upon determination in the determining that the remote operation is not allowed
providing, by the server, information stored in a storage of the controlled-side communication apparatus to the control-side communication apparatus through a relay apparatus according to the request from the control-side communication apparatus; and
newly storing use flag information, and setting the corresponding use flag information to ON based on the remote operation request related to the start of the server and setting the use flag information to OFF based on the remote operation request related to an end of the server.

* * * * *

UNITED STATES PATENT AND TRADEMARK OFFICE
CERTIFICATE OF CORRECTION

PATENT NO. : 10,225,738 B2
APPLICATION NO. : 13/977425
DATED : March 5, 2019
INVENTOR(S) : Kazuto Shimizu Page 1 of 1

It is certified that error appears in the above-identified patent and that said Letters Patent is hereby corrected as shown below:

In the Specification

Column 15, Description of Embodiments, Line 21; Before "unit", insert --transfer--

In the Claims

Column 23, Line 37; In Claim 8, delete "precleterniined" and insert --predetermined-- therefor Signed and Sealed this
Thirtieth Day of July, 2019

Andrei Iancu
*Director of the United States Patent and Trademark Office*